United States Patent [19]

Miller

[11] Patent Number: 5,372,474
[45] Date of Patent: Dec. 13, 1994

[54] GRAVITY-ASSISTED ROTATION DEVICE

[76] Inventor: Charles J. Miller, 3310 Tampa Ave., Cleveland, Ohio 44109

[21] Appl. No.: 133,576

[22] Filed: Oct. 8, 1993

[51] Int. Cl.⁵ .............................................. F01D 23/00
[52] U.S. Cl. ....................................... 415/1; 415/916; 74/84 R
[58] Field of Search ................... 415/916, 182.1, 1; 74/84 R, 84 S, 87; 472/128

[56] References Cited

U.S. PATENT DOCUMENTS

| | | | |
|---|---|---|---|
| 3,487,784 | 1/1970 | Rafferty | 415/900 |
| 4,507,048 | 3/1985 | Belenger et al. | 415/900 |
| 4,589,822 | 5/1986 | Clausen | 415/900 |
| 4,606,698 | 4/1986 | Clausen | 415/900 |
| 5,055,005 | 10/1991 | Kletschka | 415/900 |

FOREIGN PATENT DOCUMENTS 2288882  5/1976  France .................... 74/84 S

Primary Examiner—John T. Kwon
Attorney, Agent, or Firm—Roger D. Emerson

[57] ABSTRACT

An apparatus for gravity assisted rotational motion includes a frame and a axle supported on the frame. A plurality of hollow arms are rotatably supported on the axle. At the outer ends of each arm is mounted a hollow reservoir which can be selectively filled or emptied of a heavy, flowable material such as water. Heavy plates are slidably mounted on rods and alternately open or close the reservoirs depending on the location of the plate above or below the reservoir as the device rotates. The transfer of water from one side of the rotational device to the other as the device rotates minimizes the energy input necessary to rotate the device, creating an attractive and interesting attraction for miniature golf courses, circuses, county fairs, and other events.

14 Claims, 1 Drawing Sheet

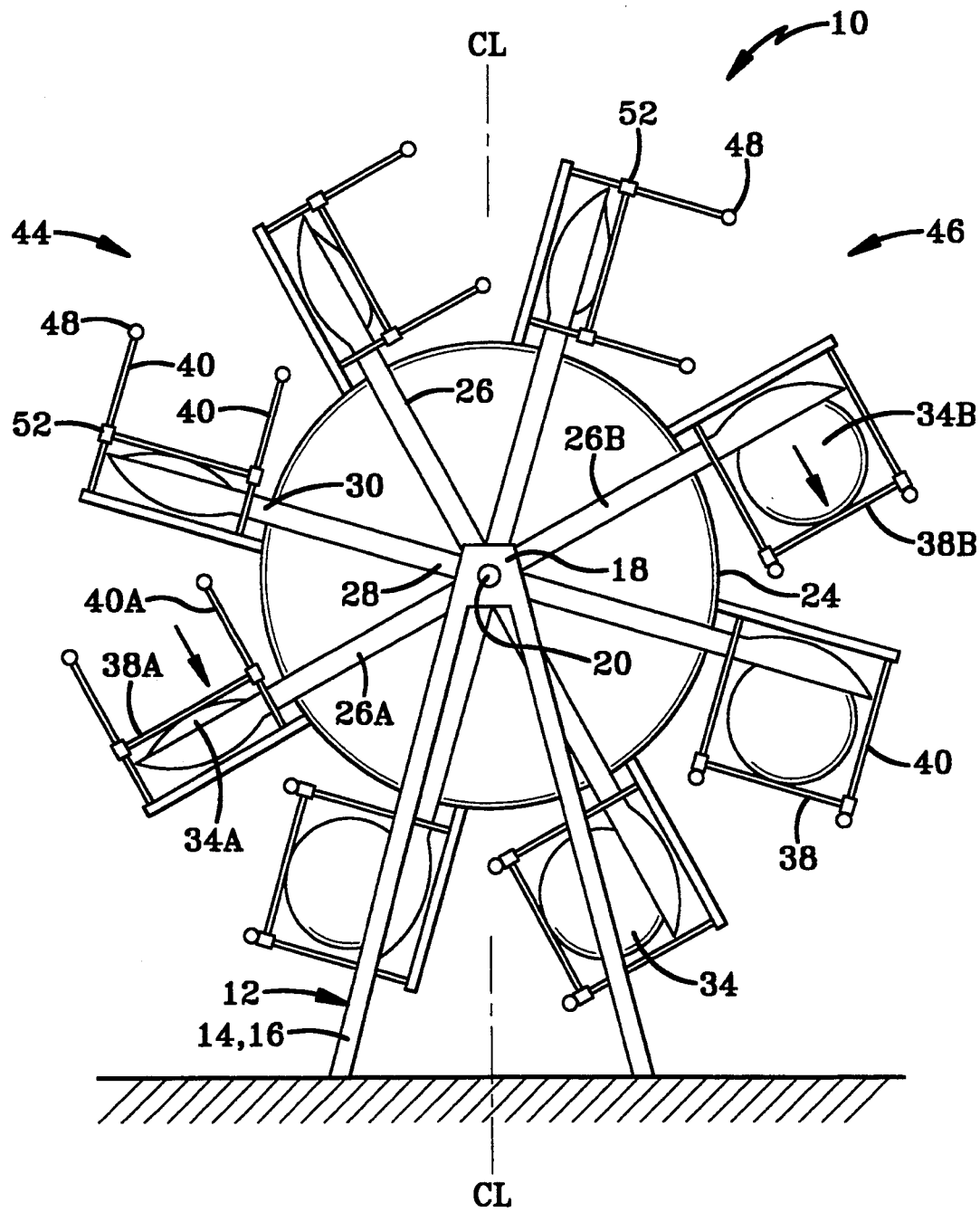

GRAVITY-ASSISTED ROTATION DEVICE

BACKGROUND OF THE INVENTION

1. Field of Invention

This invention pertains to the art of rotatable devices and more particularly to rotatable devices which are partially powered by gravity.

2. Description of the Related Art

People have always enjoyed watching rotatable devices. Old grain grinding mills were usually powered by water wheels which are prominently positioned in any promotional literature, due in part to the fascination of watching water roll over such a wheel. Similarly, miniature golf courses usually include a hole utilizing some sort of a rotational wheel. Ferris wheels, boats powered by paddle wheels, merry-go-rounds, and other rotational devices lend support to the aesthetic appeal and mechanical interest in slowly rotating mechanical devices.

However, most of the devices require considerable power input to maintain such rotation. In the example of a grinding mill, the potential and kinetic energy of the water is required to spin the wheel. In the example of the miniature golf course, a small electric motor is usually utilized to spin the wheel. Although the sources of power are appropriate for certain applications, they add nothing to the aesthetic beauty or mechanical curiosity of the wheel itself. In addition, they raise the cost of operating the device by requiring sometimes significant energy input, thereby raising the cost of operating the device.

The present invention contemplates a new and improved rotational device which is simple in design, effective in use and overcomes the foregoing difficulties in others while providing better and more advantageous overall results.

SUMMARY OF THE INVENTION

In accordance with the present invention, a new and improved rotational device is provided.

More particularly, in accordance with the invention, an apparatus for rotational motion comprises a frame, an axle supported on the frame, a plurality of arms rotatably supported on the axle. Each of the arms is hollow and has an inner end and an outer end. The inner ends of the arms are rotatably attached to the axle. Reservoir means are mounted on each of the outer ends of the arms and are selectably fillable with a flowable material. Discharging means for selectably discharging the flowable material from the reservoir means pushes the flowable material out of the reservoir means and through the hollow arms.

In accordance with another aspect of the invention, the reservoir means includes collaspable elastomeric membranes. The flowable material is water or a material having a specific gravity greater than 1.0.

According to another aspect of the invention, the discharging means includes a generally planar, weighted plate mounted adjacent the reservoir means. The weighted plate is slidably mounted on rods which are perpendicular to the plates.

According to a still further aspect of the invention, a method of rotating a wheel-like member includes the steps of filling the reservoirs on a first side of a wheel-like member with a heavy flowable material, rotating the wheel-like member to impart rotational energy to the wheel-like member, discharging the flowable material from the reservoirs on the first side of the wheel-like member by discharge means pressing down on top sides of the reservoirs thereby forcing the flowable material through the hollow arms and into the reservoirs on a second side of the wheel-like member, and continuing to rotate the wheel-like member by repeated filling and discharging of the reservoirs on opposite sides of the wheel-like member.

One advantage of the present invention is the provision of a new rotatable device which can be used to provide an aesthetically pleasing and mechanically interesting novelty for various events such as miniature golf courses, county fairs, toys, circuses, and the like.

Another advantage of the invention is the provision of an energy efficient rotating mechanism whereby a minimum of amount of energy is necessarily input to the rotational device to maintain rotation for indefinite or long periods of time. In a perfect environment with no frictional losses, the device could theoretically rotate with no energy input at all.

Still another advantage of the invention is its few number of moving parts, leading to high reliability and low maintenance.

A still further advantage of the invention is the simplicity of design with the attendant low manufacturing cost.

Still other benefits and advantages of the invention will become apparent to those skilled in the art to which it pertains upon a reading and understanding of the following detailed specification.

BRIEF DESCRIPTION OF THE DRAWING

The invention may take physical form in certain parts and arrangements of parts, a preferred embodiment of which will be described in detail in this specification and illustrated in the accompanying drawing which forms a part hereof and wherein:

The FIGURE is a front plan view of a gravity assisted rotation device according to the invention.

DESCRIPTION OF THE PREFERRED EMBODIMENT

Referring now to the FIGURE wherein the showing is for purposes of illustrating a preferred embodiment of the invention only and not for purposes of limiting the same, the FIGURE shows a rotational device 10 according to the invention. More specifically, the rotational device comprises a frame 12 which includes two "A-shaped" members 14,16. (In the FIGURE, a rear "A-shaped" member 16 is directly behind a front "A-shaped" member 14.) At the top of the A-shaped members 14,16 is an axle 20. The wheel 24 is rotatably mounted on the axle 20. The rotational device 10 further includes hollow arms 26. The arms 26 have an inner end 28 and an outer end 30. Each of the outer ends 30 terminates into a reservoir 34.

In the preferred embodiment shown in the FIGURE, there are eight arms 26. It is believed the device 10 will operate successfully with as few as four arms, or perhaps even two, although eight is believed to be the minimum for efficient operation. It is foreseen that many more arms could be added to a large rotational member, such as the size of a conventional ferris wheel at an amusement park.

The arms 26 can be made of any material chosen with appropriate engineering judgement, depending on the application, the size of the rotational device 10, the weight of the flowable material (to be discussed later) and other considerations. In one embodiment, the arms 26 are made of polyvinylchloride plastic pipe.

Similarly, the reservoirs 34 can take a variety of forms. The reservoirs can be selectably filled or emptied. Some possible forms of the reservoirs 34 could be collaspable tanks, elastomeric membranes, balloons, etc.

Mounted adjacent each reservoir 34 is weighted plate 38. Each plate 38 is slidably mounted on rods 40 via linear bearings 52. The rods 40 are generally perpendicular to their respective plate 38. The rods 40 include end stops 48.

For purposes of illustrating the operation of the device 10, a centerline CL is shown, separating a left or first side 44 of the device 10 from a right or second side 46 of the device 10. The operation of the device 10 is as follows:

The reservoirs 34 on the second side 46 of the device 10 are filled with a flowable material. The flowable material is ideally a heavy liquid such as water, mercury, or other liquid having a specific gravity greater than 1.0. Water is the preferred flowable material, due to its low cost and availability. If have of the reservoirs 34 are filled, such as each reservoir on the second side 46 of the device 10, the device 10 will be unbalanced and will seek to rotate so that such filled reservoirs 34 are on a bottom half of the device 10. As the device 10 rotates, the reservoir 34A is squeezed by weighted plate 38A. The weighted plate 38A slides down rods 40A in response to gravity. The weighted plate 38A pushes the water from the reservoir 34A upwardly through hollow arm 26A and into hollow arm 26B. As the device 10 turns, nearly all of the water in reservoir 34A travels through hollow arms 26A and 26B until it accumulates in reservoir 34B. At the same time, gravity, which caused weighted plate 38A to squeeze reservoir 34A has caused weighted plate 38B to drop away from reservoir 34B.

The process just described for is repeated about the circumference of the wheel 24 for each of the paired arms 26, reservoirs 34 and weights 38. The transference of the weighted material from the first side 44 of the wheel 24 to the second side 46 is resisted by the friction in the bearings of the axle 20, wind resistance to the arms 26 and reservoirs 34 turning, and the fluid friction losses due to the flowable materials flowing through the arms 26. It is believed that as the losses are minimized, the rotational device 10 could rotate with very little energy input necessary.

The invention has been described with reference to a preferred embodiment. Obviously, modifications and alterations will occur to others upon a reading and understanding of this detailed specification. It is intended to include all such modifications and alterations insofar as they come within the scope of the appended claims or the equivalence thereof.

Having thus described the invention, it is now claimed:

1. An apparatus for rotational motion comprising:
    a frame;
    an axle supported on said frame;
    a plurality of arms rotatably supported on said axle, each of said arms being hollow and having an inner end and an outer end, said inner ends of said arms being rotatably attached to said axle;
    reservoir means mounted on each of said outer ends of said arms, said reservoir means selectably fillable with a flowable material; and,
    discharging means for selectably discharging said flowable material from said reservoir means.

2. The apparatus of claim 1 wherein said reservoir means comprises collapsible elastomeric membranes.

3. The apparatus of claim 1 wherein said flowable material is water.

4. The apparatus of claim 1 wherein said flowable material is a material with a specific gravity greater than 1.0.

5. The apparatus of claim 1 wherein said discharging means comprises a generally planar weighted plate mounted adjacent said reservoir means.

6. The apparatus of claim 5 wherein said weighted plate is slidably mounted on rods.

7. The apparatus of claim 6 wherein each of said rods are perpendicular to said plates mounted adjacent thereto.

8. The apparatus of claim 1 wherein said flowable material is flowable from a first reservoir means into an outer end of a first arm, through said first arm, out an inner end of said first arm, into an inner end of a second arm, through said second arm, out an outer end of said second arm and into a second reservoir means.

9. The apparatus of claim 1 wherein said frame comprises first and second "A-shaped" members, each of said members having a top, said axle being mounted near said top of said "A-shaped" members.

10. A method of rotating a wheel-like member, said wheel-like member comprising a plurality of hollow arms rotatably affixed to an axle, said arms having outer ends terminating in selectably fillable and drainable reservoirs mounted adjacent weighted discharge means for discharging said reservoirs, said method comprising the steps of:
    a.) filling said reservoirs on a first side of said wheel-like member with a heavy, flowable material;
    b.) rotating said wheel-like member to impart a rotational energy to said wheel-like member;
    c.) discharging said flowable material from said reservoirs on said first side of said wheel-like member by said discharge means pressing down on top sides of said reservoirs, thereby forcing said flowable material through said hollow arms and into said reservoirs on a second side of said wheel-like member; and,
    d.) continuing to rotating said wheel-like member by the repeated filling and discharge of said reservoirs on opposite sides of said wheel-like member.

11. The method of claim 10 wherein said flowable material is water.

12. The method of claim 10 wherein said reservoir means comprises collapsible elastomeric membranes.

13. The method of claim 10 wherein said flowable material is a material with a specific gravity greater than 1.0.

14. The method of claim 10 wherein said discharging means comprises a generally planar weighted plate mounted adjacent said reservoir means.

* * * * *